(12) United States Patent
Kwatra et al.

(10) Patent No.: US 10,991,361 B2
(45) Date of Patent: Apr. 27, 2021

(54) METHODS AND SYSTEMS FOR MANAGING CHATBOTS BASED ON TOPIC SENSITIVITY

(71) Applicant: INTERNATIONAL BUSINESS MACHINES CORPORATION, Armonk, NY (US)

(72) Inventors: Shikhar Kwatra, Durham, NC (US); Paul Krystek, Highland, NY (US); Sarbajit Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 135 days.

(21) Appl. No.: 16/241,703

(22) Filed: Jan. 7, 2019

(65) Prior Publication Data

US 2020/0219484 A1 Jul. 9, 2020

(51) Int. Cl.
| | |
|---|---|
| H04W 4/02 | (2018.01) |
| G10L 15/07 | (2013.01) |
| H04L 12/58 | (2006.01) |
| H04L 29/08 | (2006.01) |
| G10L 15/18 | (2013.01) |
| G10L 17/26 | (2013.01) |
| G10L 13/00 | (2006.01) |
| G10L 15/26 | (2006.01) |

(52) U.S. Cl.
CPC ............ *G10L 15/075* (2013.01); *G10L 13/00* (2013.01); *G10L 15/1815* (2013.01); *G10L 15/26* (2013.01); *G10L 17/26* (2013.01); *H04L 51/02* (2013.01); *H04L 67/306* (2013.01)

(58) Field of Classification Search
CPC ................. G10L 15/22; H04W 4/02
See application file for complete search history.

(56) References Cited

U.S. PATENT DOCUMENTS

| | | | | |
|---|---|---|---|---|
| 8,400,322 | B2 * | 3/2013 | Acedo | G06T 3/40 |
| | | | | 340/686.6 |
| 2006/0226977 | A1 * | 10/2006 | DeLozier | G08B 25/14 |
| | | | | 340/541 |
| 2015/0208191 | A1 * | 7/2015 | Sako | H04R 1/403 |
| | | | | 381/303 |
| 2015/0235132 | A1 | 8/2015 | Allen et al. | |
| 2016/0171119 | A1 | 6/2016 | Bufe et al. | |
| 2017/0048170 | A1 | 2/2017 | Smullen et al. | |
| 2017/0357638 | A1 | 12/2017 | Schlesinger et al. | |
| 2017/0364324 | A1 * | 12/2017 | Lee | G06F 3/048 |
| 2018/0027373 | A1 * | 1/2018 | Wang | H04W 4/023 |
| | | | | 455/456.3 |
| 2018/0035072 | A1 * | 2/2018 | Asarikuniyil | H04N 21/8106 |
| 2019/0149584 | A1 * | 5/2019 | DiBello | H04N 21/8126 |
| | | | | 709/204 |
| 2019/0268460 | A1 * | 8/2019 | Agrawal | H04W 4/021 |
| 2020/0175976 | A1 * | 6/2020 | Rakshit | H04L 67/306 |

\* cited by examiner

*Primary Examiner* — Shreyans A Patel
(74) *Attorney, Agent, or Firm* — Griffiths & Seaton PLLC

(57) ABSTRACT

Embodiments for managing a chatbot by one or more processors are described. A communication is received from a first individual. The presence of a second individual within a proximity of a speaker is detected. A response to the communication is determined based on the communication and the detected presence of the second individual. The determined response is caused to be executed.

21 Claims, 6 Drawing Sheets

METHODS AND SYSTEMS FOR MANAGING CHATBOTS BASED ON TOPIC SENSITIVITY

BACKGROUND OF THE INVENTION

Field of the Invention

The present invention relates in general to computing systems, and more particularly, to various embodiments for managing chatbots based on the sensitivity the content of generated responses.

Description of the Related Art

Chatbots, also known as talkbots, chatterbots, bots, instant messaging (IM) bots, interactive agents, Artificial Conversational Entities (ACEs), voice response systems, etc., are computer nodes (i.e., devices and/or programs) or artificial intelligence modules which are able to conduct conversations with individuals (or users) through auditory (e.g., speech/voice) or text-based methods. Such programs are often designed to convincingly simulate how humans behave as conversational partners. As such, users may ask questions, and the chatbot may answer (or respond) based on its knowledge base and/or by analyzing the question, providing the best answer it can generate.

However, chatbots do not generally take into consideration the potentially sensitive nature of generated responses. That is, generated responses are typically only based on the received command (e.g., a question). As such, when a response is provided in an auditory (or aural) form, any sensitive or inappropriate content may be overheard by anyone in the vicinity of the device (or speaker), and not just the user who provided the command.

SUMMARY OF THE INVENTION

Various embodiments for managing chatbots by one or more processors are described. In one embodiment, by way of example only, a method for managing a chatbot, again by one or more processors, is provided. A communication is received from a first individual. The presence of a second individual within a proximity of a speaker is detected. A response to the communication is determined based on the communication and the detected presence of the second individual. The determined response is caused to be executed.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
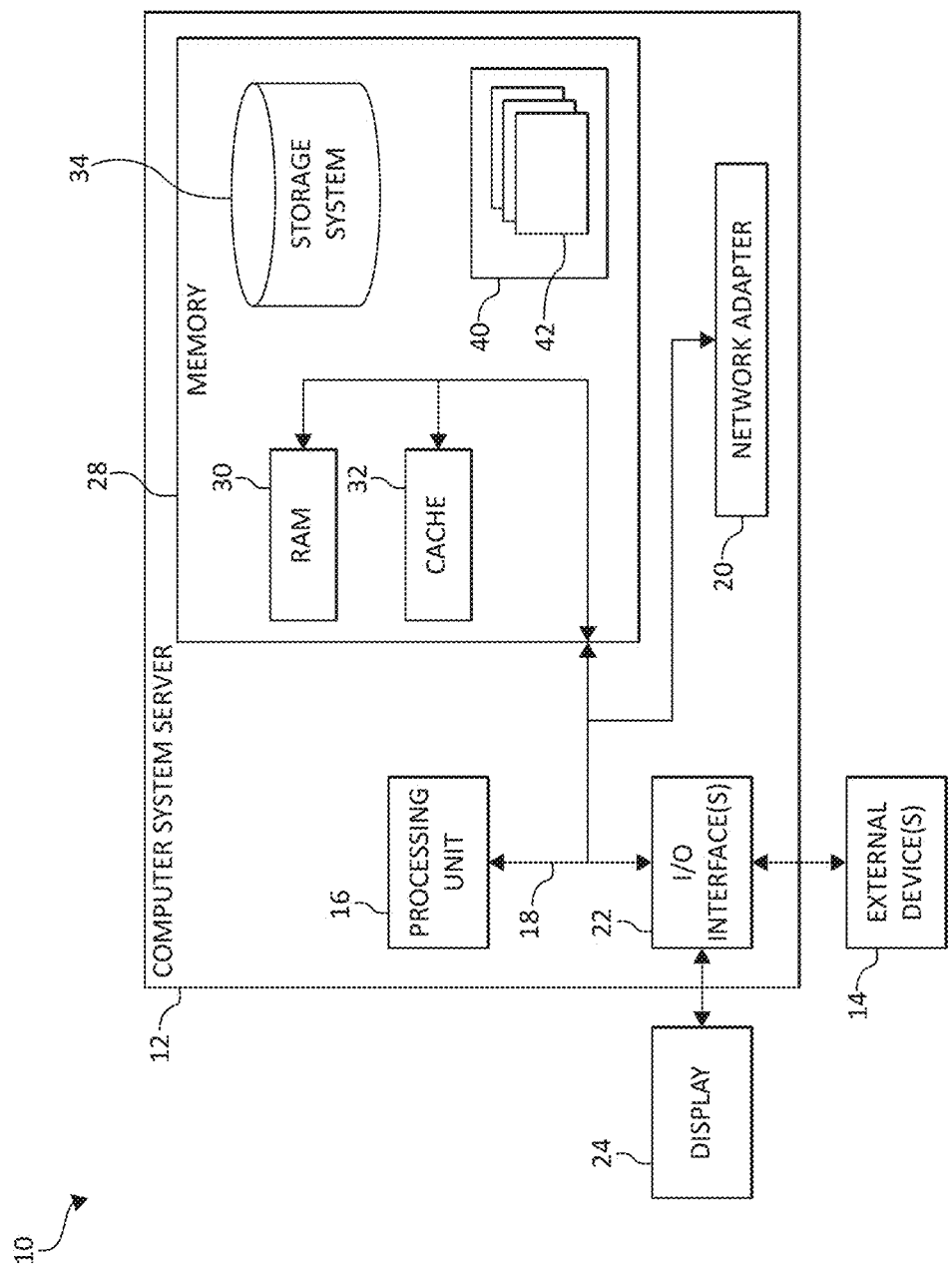
FIG. 1 is a block diagram depicting an exemplary computing node according to an embodiment of the present invention.

As discussed above, chatbots, also known as talkbots, chatterbots, bots, instant messaging (IM) bots, interactive agents, Artificial Conversational Entities (ACEs), voice response systems, etc., are computer nodes (i.e., devices and/or programs) or artificial intelligence modules which are able to conduct conversations with individuals (or users) through auditory (e.g., speech/voice) or text-based methods. Such programs are often designed to convincingly simulate how humans behave as conversational partners. As such, users may ask questions, and the chatbot may answer (or respond) based on its knowledge base and/or by analyzing the question, providing the best answer it can generate.

However, chatbots do not generally take into consideration the potentially sensitive nature of generated responses. That is, generated responses are typically only based on the received command (e.g., a question). As such, when a response is provided in an auditory (or aural) form, any sensitive or inappropriate content may be overheard by anyone in the vicinity.

For example, consider a scenario in which a user asks a chatbot about items listed on their schedule for that day. If the user has a doctor's appointment that day that they consider to be a personal and/or sensitive subject, they may be embarrassed if the answer to their question is provided in an auditory form and other individuals are able to hear the response. Similarly, if the user asks a question to which the generated response has political, religious, social, etc. implications, other individuals who overhear the response may be offended.

As such, current chatbot systems may be considered to lack several features. For example, current chatbots systems do not take into consideration topic sensitivities of individuals what may overhear the response. Current systems do not have a cognitive understanding of individuals (e.g., besides the user providing the command) within the vicinity of the device (e.g., within "earshot" or "hearing distance" of the speaker that renders the auditory response). Additionally, current systems do not dynamically react to observed reactions of individuals (e.g., the user or other individuals) to generated responses. Further, current systems do not utilize cognitive feedback to generate a dynamic user knowledge base that may be used to generate optimal responses.

Thus, there is a need for methods and systems for chatbot systems that, for example, utilize knowledge of the user's topic sensitivities and that of other individuals within earshot of the chatbot device/system (e.g., the speaker).

To address these needs, some embodiments described herein provide methods and systems for managing (or controlling) chatbots (or chatbot systems) with the ability to understand voice commands (e.g., questions) and generate customized responses, adjusting for various types of sensitivities of the user providing the command and/or individuals within earshot (or vocal range) of the chatbot system. For example, an auditory response may be generated, which is changed from the response that would be generated in other circumstances (e.g., without the other individuals within vocal range), or the rendering of the auditory response may be at least delayed and/or a suitable notification may be provided to the user (as described below).

As such, in some embodiments, methods and systems are provided that dynamically manage chatbot operation based on sensor supported feedback and a cognitive understanding of users within the vicinity of the chatbot device. Thus, the methods and systems described herein may enable chatbots to provide responses (e.g., auditory responses) in such a way as to consider the sensitivities of the individuals present and protect confidential information.

In some embodiments, the chatbot system generates auditory responses to commands (e.g., voice commands/questions or text-based commands/questions) based on at least one data source combined with the detected presence of another individual (e.g., an individual besides the user who generated/provided the command) in a proximity or vicinity of the chatbot device/system, or more particularly, a speaker utilized to render the response (e.g., within a predetermined distance/range of the speaker, in the same room as the speaker, etc.). When a voice command is received, if the response as would normally be generated (e.g., based solely on information related to the user and/or particular data sources, without taking into account the presence of the other individual) is determined to include sensitive information and/or be inappropriate in some way for the other individual to hear, the system may adjust (or generate) the response in such a way to lessen the sensitive nature of the response. For example, the system may generate a response that changes the topic of conversation, modify the names of individuals or objects referenced in the response, transfer the response to a computing device associated with the user (i.e., as opposed to rendering the response in an auditory form), or at least partially deny the command (i.e., not provide a response or only respond to particular aspects of the command/question). However, it should be understood that the methods and systems described herein may be applied to other types of responses generated by chatbots (or voice response systems), such as actions performed utilizing other computing devices (e.g., playing music, a video, etc.).

The data source(s) utilized may include, for example, any available data sources associated with the user (i.e., the individual providing the command) and/or other individuals detected to be in the vicinity of the chatbot. For example, in some embodiments, a profile (e.g., a cognitive profile) for the user(s) (i.e., the user providing the command and/or other individuals) may be generated. Data sources that may be use used to generate a cognitive profile for the user(s) may include any appropriate data sources associated with the user that are accessible by the system (perhaps with the permission or authorization of the user). Examples of such data sources include, but are not limited to, communication sessions and/or the content (or communications) thereof (e.g., phone calls, video calls, text messaging, emails, in person/face-to-face conversations, etc.), a profile of (or basic information about) the user (e.g., job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases.

In some embodiments, the methods and systems described herein utilize a cognitive analysis that is performed on the available data sources. The cognitive analysis may also include classifying natural language, analyzing tone, and analyzing sentiment (e.g., scanning for keywords, key phrases, etc.) with respect to, for example, communications sent to and/or received/detected by chatbots and/or available data sources. In some embodiments, natural language processing (NLP), Mel-frequency cepstral coefficients (MFCCs), and/or region-based convolutional neural network (R-CNN) pixel mapping (e.g., for images/videos sent to chatbots), as are commonly understood, are used. Over time, the methods and systems described herein may determine correlations (or insights) between communications (e.g., voice and/or text-based communications) received by chatbots and responses generated by chatbots, perhaps with feedback provided by the users, that allows for the performance of the system to improve with continued use.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the management of chatbot operation as described herein. Utilizing the models, the performance (or operation) of the system (e.g., utilizing/based on new inputs) may be predicted and/or the performance of the system may be optimized by investigating how changes in the input(s) effect the output(s).

In some embodiments, various types of sensors may be utilized to detect the presence of other individuals in the vicinity of the chatbot system (and/or a speaker utilized thereby). Examples include cameras, microphones, motion sensors, and wireless communications (e.g., to detect the presence of computing devices associated with the individuals).

It should be understood that as used herein, the term "computing node" (or simply "node") may refer to a computing device, such as a mobile electronic device or a desktop computer, and/or an application, such a chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In some embodiments, methods and systems are provided that manage chatbots and/or alter responses to commands (e.g., voice commands or text-based commands) provided by chatbots. The presence of users (e.g., the user providing the command and other individuals) within the vicinity of the chatbot system (e.g., within listening range of a speaker utilized by the chatbot) may be determined or detected. The sensitivity (or appropriateness) of the content (or information) to be provided in the response, as at least potentially perceived by the users in the vicinity, may be predicted or determined. Ameliorative actions that may be taken to at least lessen the sensitivity (and/or increase the appropriateness) of the content may be classified (e.g., using custom machine learning algorithms). At least one of the ameliorative actions may be selected based on at least one optimization objective. At least one of the ameliorative actions may be taken (or initiated) to provide an optimal response to the received command, taking the user(s) reactions into consideration.

Examples of ameliorative actions include, but are not limited to, the following: changing the topic of conversation; modifying the names or objects referenced in the response; transferring the response to another computing device (e.g., sending a text message or email including the response to a computing device of the user providing the command); denying the response or altering the command (e.g., answering a slightly different question); adjusting the sensitivity parameters of the user's profile; providing a partial response (e.g., providing an answer to only some of the aspects of the user's question and not others); adjusting the manner in which the response is rendered (e.g., rendering the auditory response at a reduced volume).

In some embodiments, content sensitivity (and/or appropriateness) is evaluated or determined based on the profile of the users (e.g., the user providing the command or another individual within hearing distance of the device). Sensitive topics may be determined or identified with respect to, for example, cultural, political, social, religious, etc. affairs.

In some embodiments, a machine learning model may be utilized to classify assessed optimal responses and risk vectors to determine or generate actions that may be taken as part of the amelioration process (i.e., modifying the response to less the sensitive nature of the response). In some embodiments, feedback from the users may be utilized to improve the operation of the system over time. The feedback may be explicit feedback provided by the users (e.g., the user providing the command) or implicit feedback determined by monitoring the reactions of users to chatbot responses (e.g., via cameras, microphones, etc.).

In particular, in some embodiments, a method for managing a chatbot by one or more processors is provided. A communication is received from a first individual. The presence of a second individual within a proximity of a speaker is detected. A response to the communication is determined based on the communication and the detected presence of the second individual. The determined response is caused to be executed.

The determined response may include an auditory response. The causing of the determined response to be executed may include causing the auditory response to be rendered by the speaker.

The determining of the response to the communication may be further based on at least one data source associated with at least one of the first individual and the second individual. The determining of the response to the communication may be performed utilizing a cognitive analysis. The communication may include a voice communication.

The determined response may include an auditory response. The causing of the determined response to be executed may include causing the auditory response to be at least temporarily prevented from being rendered by the speaker, and causing a notification of the auditory response to be rendered by a computing device associated with the first individual.

Feedback may be received from the first individual after the causing of the determined response to be executed. A second communication may be received from the first individual. A second response to the second communication may be determined based on the second communication and the received feedback.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc., and/or any other computing node utilizing a chatbot and/or in/through which a chatbot may be implemented. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
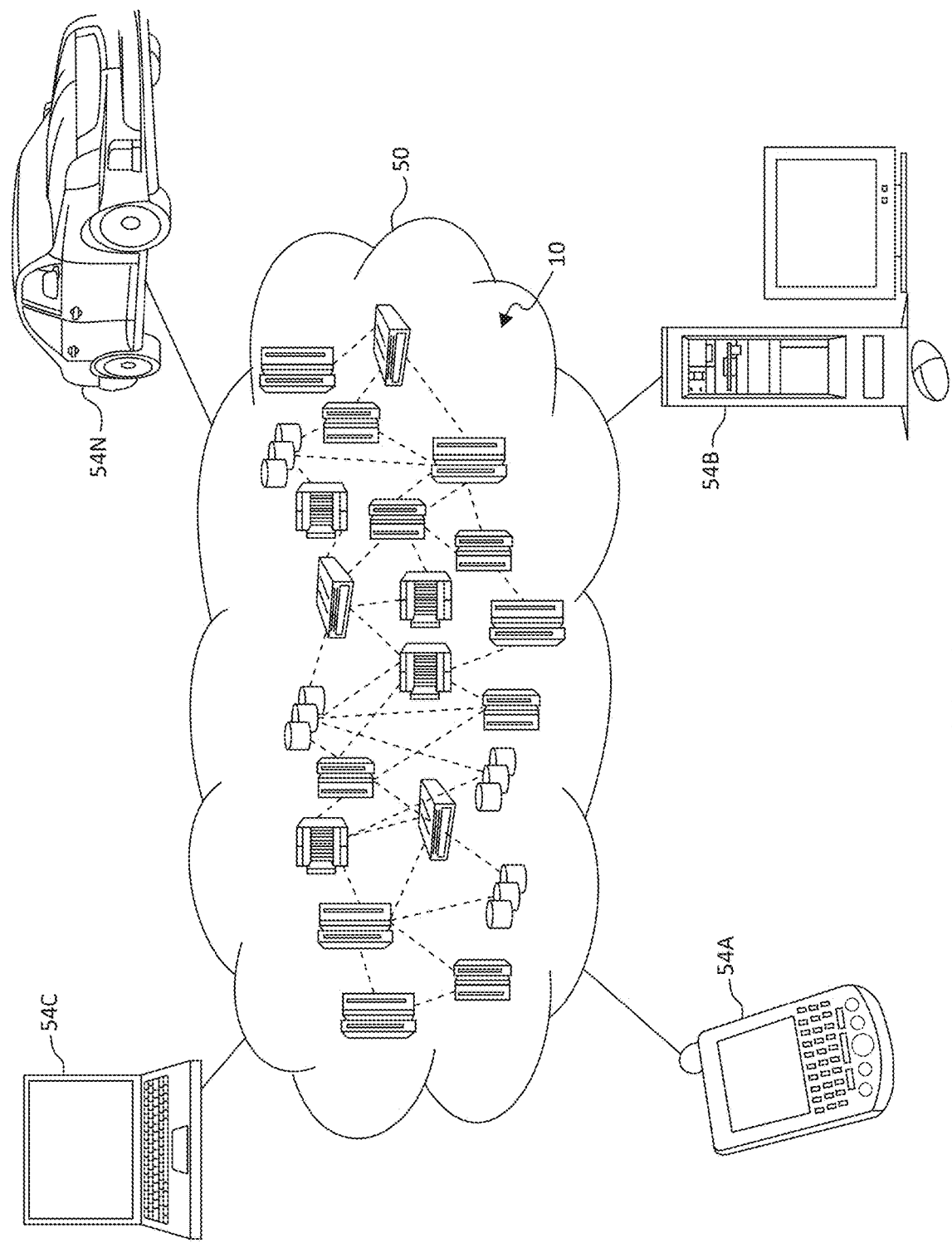
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
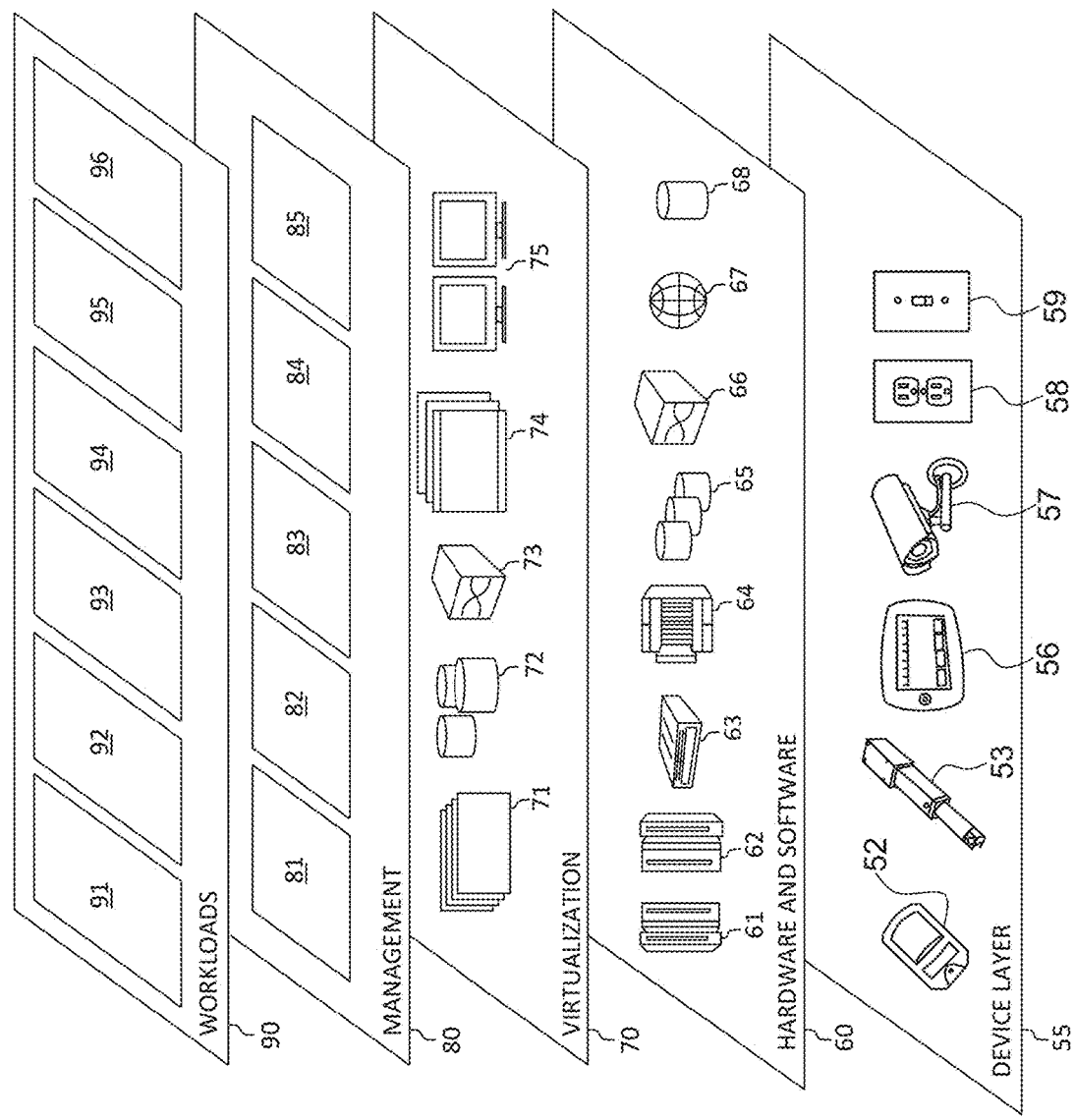
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing chatbots (and/or the operation thereof) as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and systems are provided that, for example, manage (or control) chatbots (or chatbot systems) in such a way as to understand voice commands (e.g., questions) and generate customized responses, adjusting for various types of sensitivities of the individuals within earshot (or vocal range) of the chatbot system. As such, in some embodiments, methods and systems are provided that dynamically manage chatbot operation based on sensor supported feedback and a cognitive understanding of users within the proximity of the chatbot device.

In some embodiments, the user(s) provides their credentials to the system and/or registers with the system (i.e., provides the system with the information that is used to perform the chatbot management described herein, which may be used to generate a profile for the user). In some embodiments, wireless communication (e.g., near-field communication) may be utilized to transfer any appropriate data from a computing device of the user (e.g., a mobile electronic device) to the chatbot system (and/or a control or cognitive module managing the operation of the chatbot). However, in some embodiments, the user may manually enter any appropriate information. The system may also be able to identify users via sensors (e.g., voice recognition via microphones, facial recognition via cameras, etc.).

In some embodiments, topical preference sensitivities are then defined. The user may manually indicate such sensitivities (e.g., via a preferences/settings functionality). However, the system may also perform such functionality automatically. For example, using data transferred from another computing device, the system may investigate user topical interests (or other "safe" topics), as well as topical sensitivities (e.g., religion, ethnicity, social issues, political matters, humor, etc.). The system may also perform such based on user-entered credentials/information and/or system-created credentials (e.g., via sensors, available social data sources, such as newsfeeds, etc.), perhaps combined with other information about the user (e.g., gathered from social media activity, various types of communications, etc.). If the system is not able to establish expanded user credentials as described above, the system may create a unique set of user credentials and learn topics of interest based on, for example, commands received (e.g., questions asked by the user) and learn social sensitivities based on conversational interaction (e.g., with the chatbot and/or other individuals) and sensor information (e.g., user reactions to various stimuli).

In some embodiments (e.g., while a command is being received from the user, after a command is received from the user, and/or while a response to the command is being generated or determined), the system utilizes various sensors (e.g., audio, video, near-field, etc.) to detect the presence of individuals (e.g., besides the user who provided the command) within the vicinity or within a proximity (e.g., within the same room, within a predetermined distance, etc.) of the chatbot system or device, or more particularly, within audio/hearing range of a speaker utilized by the chatbot system to render auditory responses. If one or more other individuals are determined to be within range, the system (if needed) adjusts or modifies the response (and/or the manner in which the response is provided/rendered) based on the topical interests and sensitivities of the user and/or the other individuals. In this manner, the system may generate a customized response that takes into consideration the sensitivities of the combined group of individuals that may hear the response.

In some embodiments, the system utilizes a temporal buffering module or functionality. For example, the computing device utilized may include a long short-term memory (LSTM) module that is capable of buffering a sequence of commands. NLP may be utilized for semantic and syntactic information processing to understand the user's commands (e.g., questions or queries) and reactions (e.g., moods). A timestamp and geo-spatial metrics may be associated with the commands.

The system may monitor users (or individuals) as they move into and out of audio range and dynamically adjust the optimized response to the individuals that are determined to be within range when, for example, the response is rendered. If a location has multiple chatbot response devices linked (or in operable communication with each other) for a common response via these devices, the chatbot system may combine all the users in to one virtual group and optimize its response to this combined group. Output captured from LSTM model which involves buffered spoken words from the user may be used as input features for the iterative machine learning model. Other input features may include geo-spatial metrics (e.g., as determined via a GPS module) and temporal metrics, along with users (and respective profiles thereof) detected via cameras, microphones, etc.

In some embodiments, the system may utilize feedback from the user and/or other individuals to improve performance over time. For example, the system may dynamically monitor the user and other individuals within audio range for voice characteristics (e.g., tone and intonation) and visual characteristics (e.g., body language, facial expressions, etc.) to understand their reactions to responses provided by the chatbot (e.g., positive vs. negative sentiment).

Additionally, after the response has been rendered by the chatbot, a feedback learning component of the recurrent neural network (RNN) model may monitor the user's cognitive heuristics for a configurable time period (T) in order to understand the user's satisfaction level (or reaction) in correlation with the response and prioritize/readjust the response set based on the correlation. Thus, as part of iterative learning feedback, historical pattern analysis may be considered in conjunction with real-time metrics as stated above.

In some embodiments, the system may note user sensitivities and use feedback make changes to the ameliorative actions. For example, the system may make dynamic adjustments of the system's responses based on newly observed user sensitivities for the duration of the chatbot session (e.g. user local presence). The system may also dynamically update of user preferences relating to topical and or social sensitivities. The system may also record the newly noted sensitivities for a particular user and adjust user sensitivity preferences only after multiple sensitivities have been detected. The speed of profile adjustment may be a user preference setting (e.g., via a rigidity factor).

Figure 4:
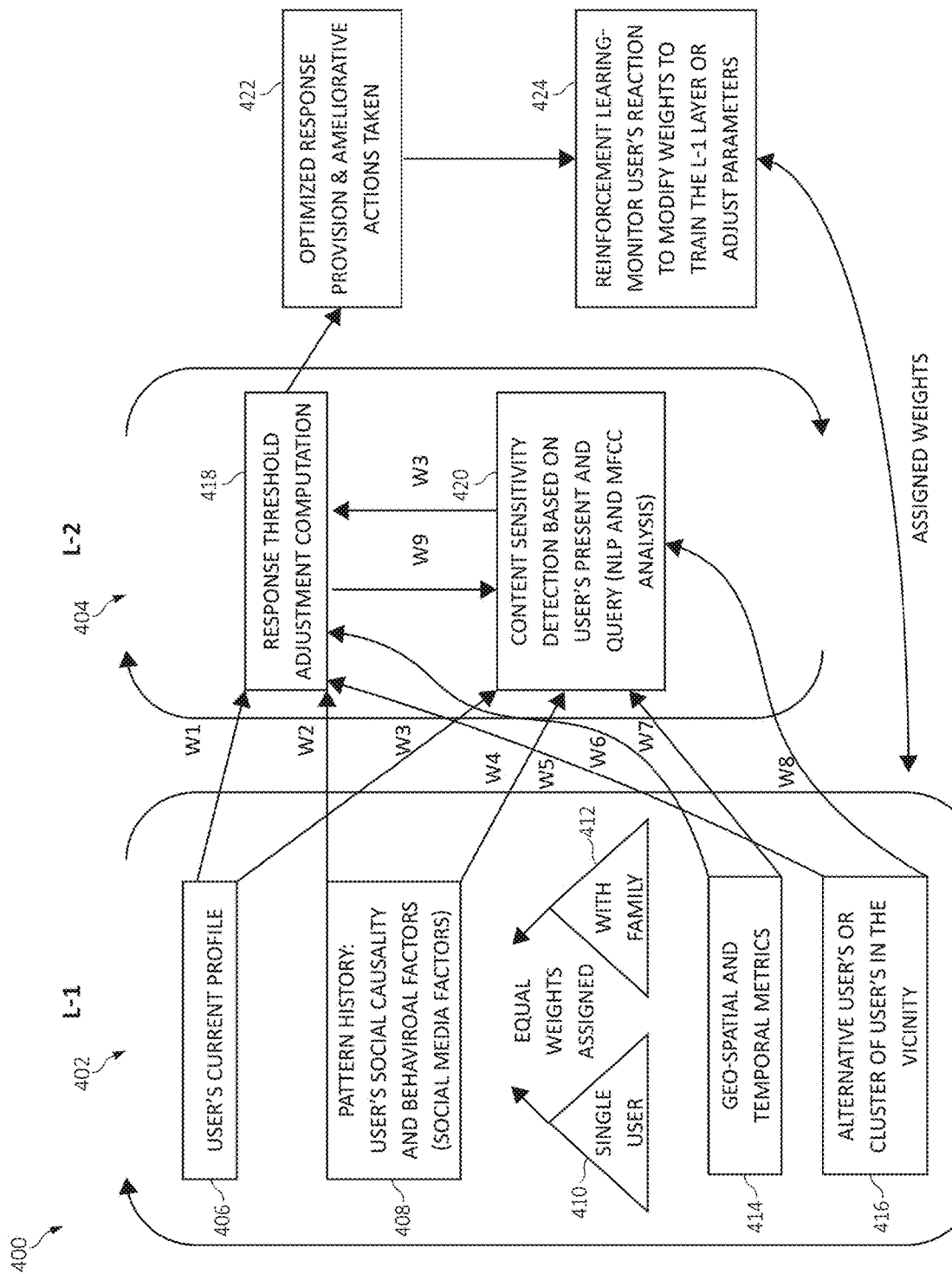
FIG. 4 is a diagram of a classification model according to an embodiment of the present invention.

FIG. 4 illustrates a multi-level neural network classification model 400 according to some embodiments described herein. The model 400 may, for example, proactively obtain user feedback and social media information to determine topic sensitivities based on the cognitive heuristics (or a cognitive profile) of the user and/or other individuals. The model includes a first layer (L-1) 402 and a second layer (L-2) 404. The first layer 402 includes (and/or utilizes) the user's current profile 406, a pattern history 408 (i.e., the user's social causality and behavioral factors, such as social media factors), including those of the user 410 and other individuals 412 (e.g., the user's contacts), geo-spatial and temporal metrics 414, and information related to other individuals in the vicinity 416. The pattern history of the user 410 and other individuals 410 may be assigned equal weights in some embodiments. However, the weights may be configurable, as may the other weights (W1-W9) shown in FIG. 4.

The second layer 404 includes (and/or utilizes) a response threshold adjustment computation 418 based on, for example, components 406-416 in the first layer 402, as well as content sensitivity detection 420 that may be based on the individuals detected as being present and the received command (e.g., a query), which may be determined, for example, via NLP and MFCC analysis, as well as components 406-416 in the first layer 402. From the response threshold adjustment computation 418, an optimized response is generated and/or ameliorative actions are taken 422. Reinforcement learning 424 is then performed by, for example, monitoring the reaction(s) of the user (and/or other individuals) to modify configurable weights (e.g., W1-W9) that may be used to tune the determination of topic sensitivities and/or train the first layer 402 and/or adjust parameters.

Thus, in some embodiments, the method of evaluating the content adjustment score is based on plurality of reconfigurable weighted factors which determine the overall proficiency of the system and the weighted ameliorative actions that need to be taken based on the established rigidity factor. The multi-dimensional output vector with ameliorative actions depicts the percentage of risk at different portions of the response provided by the chatbot after the training model has been run once. After multiple iterations, the training model may be adjusted accordingly. As noted above, the user's reaction and/or feedback may determine the final weights which are assigned to the system in conjunction with the most accurate vulnerabilities and provide dynamic response adjustment based on the determined command, user's profile adjustment, and other user's present in the vicinity.

Figure 5:
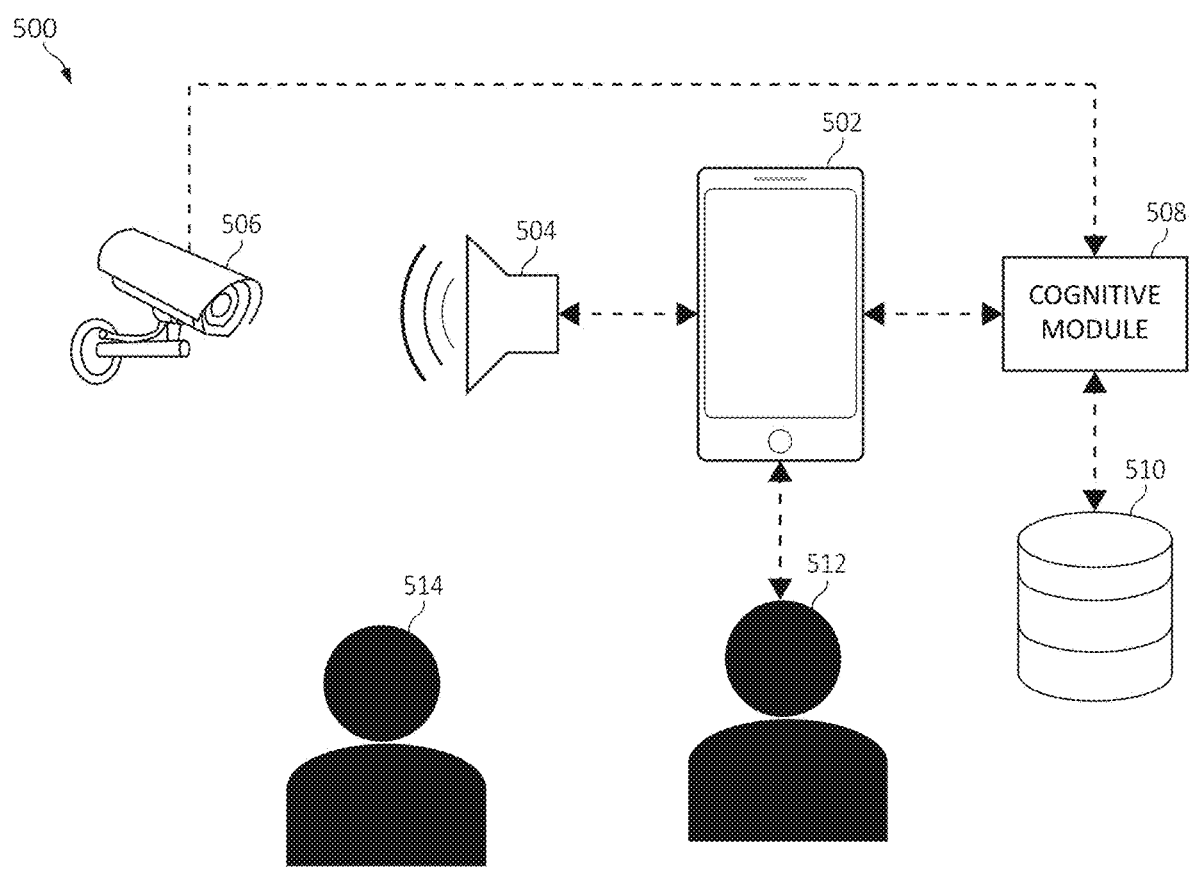
FIG. 5 is a simplified block diagram of a computing environment according to an embodiment of the present invention.

Referring now to FIG. 5, an exemplary environment (e.g., computing environment or chatbot system) 500, in which embodiments of the present invention may be implemented, is shown. The environment includes (and/or has therein) a computing device 502, a speaker 504, a sensor 506, a cognitive module 508, and a database 510. The computing device 502 may be any suitable computing device in or through which a chatbot may be implemented. In the example shown, the computing device 502 is a mobile electronic device (e.g., a mobile phone). Although not shown, the computing device 502 may include a microphone that may be used to detect or receive voice commands (or communications, questions, etc.). However, it should be understood that in some embodiments, commands may (also) be received through text-based methods (e.g., via a keyboard or touch pad on the computing device 502).

The speaker 504 may be any suitable electro-acoustic transducer (or loudspeaker) that is configured to render auditory (or audible or aural) responses from the chatbot. Although shown as a separate component, it should be understood that the speaker 504 may be integrated within the computing device 502, or another computing device, such as a desktop PC, audio system, smart television, etc.

The sensor 506 may include any type of sensor (or multiple sensors) that may be utilized by the embodiments described herein to detect the presence of individuals within the vicinity of the chatbot system, or more particularly, the speaker 504 (e.g., within a predetermined distance/range of the speaker, within the same room, etc.). Examples of suitable sensors include cameras, microphones, motion sensors, wireless communication transceivers (e.g., to detect the presence of computing devices via wireless communications), etc.

The cognitive module 508 may include any suitable computing system or device that may be configured to perform the functionality described herein. Although shown as a separate component, the cognitive module 508 may be (at least partially) integrated with the computing device 502. The cognitive module 508 is in operable communication (either directly or indirectly) with the computing device 502, the speaker 504, the sensor 506, and the database 510. The database 510 may include any suitable memory or storage device (e.g., on the cloud) for storing data related to users of the chatbot system and/or other individuals that may be utilized by the methods and systems described herein.

Still referring to FIG. 5, a user 512 provides a command to the chatbot system through the computing device 502. The command may be a voice command that is detected by a microphone on the computing device. In some embodiments, the command is (or includes) a query or question. The system detects the presence of another individual 514 within the vicinity of the chatbot system (e.g., the speaker 504). Based on the detected presence of the other individual 514, the chatbot system determines a response (and/or modifies a response) to the user's 512 command, taking into account the sensitivities of the user 512 and/or the other individual 514, as described above.

Figure 6:
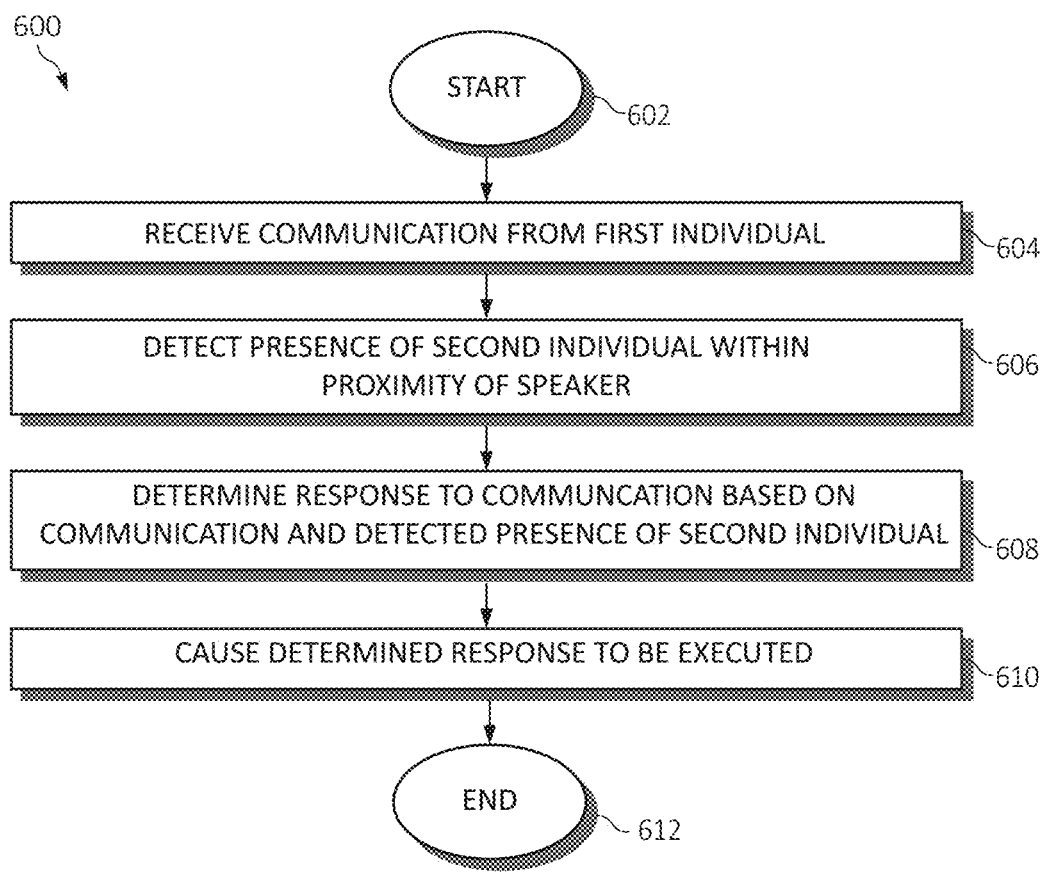
FIG. 6 is a flowchart diagram of an exemplary method for managing chatbots according to an embodiment of the present invention.

Turning to FIG. 6, a flowchart diagram of an exemplary method 600 for managing (or controlling) chatbots (and/or the operation thereof), in accordance with various aspects of the present invention, is provided. Method 600 begins (step 602) with, for example, a chatbot being installed (or otherwise implemented) on or through a computing system/device/node, such as a mobile electronic device (e.g., a mobile phone, tablet device, etc.) and perhaps any suitable data regarding a user (or a first individual), other individuals (e.g., a second individual), and/or social, cultural, political, etc. issues being received.

A communication is received from the first individual (step 604). The communication (or command) may in the form of a voice command (e.g., detected by a microphone) or a text-based command. The communication may include a question or query.

The presence of a second individual within a proximity of a speaker is detected (step 606). The speaker may be a speaker that is utilized by the chatbot to render auditory responses. The detecting of the presence of the second individual within the proximity of the speaker may include, for example, detecting the second individual within a predetermined distance of the speaker (e.g., several meters) and/or detecting the second individual within the same room as the speaker. The detecting of the presence of the second individual may be performed with any suitable sensor, such as a camera, microphone, motion sensor, etc.

A response to the communication is determined based on the communication and the detected presence of the second individual (step 608). The determined response may be an auditory response. The determining of the response to the communication may further be based on at least one data source associated with at least one of the first individual and the second individual. The determining of the response to the communication may be performed utilizing a cognitive analysis, as described above.

The determined response is caused to be executed (or is executed or generated) (step 610). The executing of the determined response may include causing an auditory response to be rendered by the speaker. As described above, the response and/or the manner in which the response is rendered may be customized based on the presence of the second individual. In some embodiments, the executing of the response may include causing the determined auditory response to be at least temporarily prevented from being rendered by the speaker and causing a notification of the determined response to be rendered by a computing device associated with the first individual. For example, rather than rendering the response with the speaker, the system may cause a notification (e.g., a text message, pop-up window, email, etc.) to be rendered by a mobile electronic device (or some other computing device), or some other visual, non-audible means. The notification may describe the auditory response and/or provide information regarding why the auditory response was not rendered by the speaker.

Method 600 ends (step 612) with, for example, feedback being received from the first individual and/or the second individual after the determined response is executed (e.g., after the response is rendered or after a notification associated with the response is provided). Subsequent communications may be received from the first individual (or other individuals). Response to the subsequent communications may be determined based, in part, on the subsequent communications and the received feedback to improve performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing a chatbot comprising:
    receiving a communication from a first individual;
    detecting the presence of a second individual within a proximity of a speaker;
    determining a response to the communication based on the communication and the detected presence of the second individual, wherein determining the response includes specifically identifying the second individual and determining whether content within the response is of a sensitive or inappropriate nature so as to whether the response is contextually appropriate for the second individual to hear; and
    causing the determined response to be executed.

2. The method of claim 1, wherein the determined response includes an auditory response, and the causing of the determined response to be executed includes causing the auditory response to be rendered by the speaker.

3. The method of claim 1, wherein the determining of the response to the communication is further based on at least one data source associated with at least one of the first individual and the second individual.

4. The method of claim 1, wherein the determining of the response to the communication is performed utilizing a cognitive analysis.

5. The method of claim 1, wherein the communication includes a voice communication.

6. The method of claim 1, wherein the determined response includes an auditory response, and the causing of the determined response to be executed includes:
    causing the auditory response to be at least temporarily prevented from being rendered by the speaker; and
    causing a notification of the auditory response to be rendered by a computing device associated with the first individual.

7. The method of claim 1, further comprising:
    receiving feedback from the first individual after the causing of the determined response to be executed;
    receiving a second communication from the first individual; and
    determining a second response to the second communication based on the second communication and the received feedback.

8. A system for managing a chatbot comprising:
    at least one processor that
        receives a communication from a first individual;
        detects the presence of a second individual within a proximity of a speaker;
        determines a response to the communication based on the communication and the detected presence of the second individual, wherein determining the response includes specifically identifying the second individual and determining whether content within the response is of a sensitive or inappropriate nature so as to whether the response is contextually appropriate for the second individual to hear; and
        causes the determined response to be executed.

9. The system of claim 8, wherein the determined response includes an auditory response, and the causing of the determined response to be executed includes causing the auditory response to be rendered by the speaker.

10. The system of claim 8, wherein the determining of the response to the communication is further based on at least one data source associated with at least one of the first individual and the second individual.

11. The system of claim 8, wherein the determining of the response to the communication is performed utilizing a cognitive analysis.

12. The system of claim 8, wherein the communication includes a voice communication.

13. The system of claim 8, wherein the determined response includes an auditory response, and the causing of the determined response to be executed includes:
    causing the auditory response to be at least temporarily prevented from being rendered by the speaker; and
    causing a notification of the auditory response to be rendered by a computing device associated with the first individual.

14. The system of claim 8, wherein the at least one processor further:
    receives feedback from the first individual after the causing of the determined response to be executed;
    receives a second communication from the first individual; and
    determines a second response to the second communication based on the second communication and the received feedback.

15. A computer program product for managing a chatbot by one or more processors, the computer program product comprising a non-transitory computer-readable storage medium having computer-readable program code portions stored therein, the computer-readable program code portions comprising:
    an executable portion that receives a communication from a first individual;
    an executable portion that detects the presence of a second individual within a proximity of a speaker;
    an executable portion that determines a response to the communication based on the communication and the detected presence of the second individual, wherein determining the response includes specifically identifying the second individual and determining whether content within the response is of a sensitive or inappropriate nature so as to whether the response is contextually appropriate for the second individual to hear; and an executable portion that causes the determined response to be executed.

16. The computer program product of claim 15, wherein the determined response includes an auditory response, and the causing of the determined response to be executed includes causing the auditory response to be rendered by the speaker.

17. The computer program product of claim 15, wherein the determining of the response to the communication is further based on at least one data source associated with at least one of the first individual and the second individual.

18. The computer program product of claim 15, wherein the determining of the response to the communication is performed utilizing a cognitive analysis.

19. The computer program product of claim 15, wherein the communication includes a voice communication.

20. The computer program product of claim 15, wherein the determined response includes an auditory response, and the causing of the determined response to be executed includes:

causing the auditory response to be at least temporarily prevented from being rendered by the speaker; and causing a notification of the auditory response to be rendered by a computing device associated with the first individual.

21. The computer program product of claim 15, wherein the computer-readable program code portions further include:

an executable portion that receives feedback from the first individual after the causing of the determined response to be executed;

an executable portion that receives a second communication from the first individual; and an executable portion that determines a second response to the second communication based on the second communication and the received feedback.

* * * * *